United States Patent [19]

Herbon et al.

[11] Patent Number: 5,074,269
[45] Date of Patent: Dec. 24, 1991

[54] ANTI-ROTATION FUEL INJECTOR CLIP

[75] Inventors: Joseph A. Herbon, Rochester Hills; Robbie L. Garrett, Sterling Heights, both of Mich.

[73] Assignee: Chrysler Corporation, Highland Park, Mich.

[21] Appl. No.: 692,427

[22] Filed: Apr. 29, 1991

[51] Int. Cl.⁵ .......................................... F02M 39/00
[52] U.S. Cl. .................. 123/470; 123/468; 123/456; 239/550; 239/600
[58] Field of Search ............... 123/456, 468, 469, 470, 123/472; 239/550, 551, 600

[56] References Cited

U.S. PATENT DOCUMENTS

| | | | |
|---|---|---|---|
| 4,092,002 | 5/1978 | Grosse et al. | 239/550 |
| 4,240,384 | 12/1980 | Urbinati et al. | 123/470 |
| 4,286,563 | 9/1981 | Fahim et al. | 123/469 |
| 4,294,215 | 10/1981 | Hans et al. | 123/470 |
| 4,307,693 | 12/1981 | Glockler et al. | 123/470 |
| 4,474,159 | 10/1984 | Katnik | 123/468 |
| 4,474,160 | 10/1984 | Gartner | 123/468 |
| 4,475,516 | 10/1984 | Atkins et al. | 123/470 |
| 4,539,961 | 9/1985 | Atkins et al. | 123/468 |
| 4,570,602 | 2/1986 | Atkins et al. | 123/468 |
| 4,660,524 | 4/1987 | Bertsch et al. | 123/468 |
| 4,823,754 | 4/1989 | Minamoto et al. | 123/470 |
| 4,909,221 | 3/1990 | Heuser | 123/456 |
| 4,915,305 | 4/1990 | O'Brien et al. | 239/550 |
| 4,984,548 | 1/1991 | Hudson, Jr. | 123/468 |
| 4,991,557 | 2/1991 | DeGrace et al. | 123/468 |
| 4,993,390 | 2/1991 | Ono et al. | 123/456 |
| 5,002,030 | 3/1991 | Mahnke | 123/469 |

Primary Examiner—Tony M. Argenbright
Assistant Examiner—Tom Moulis
Attorney, Agent, or Firm—Kenneth H. MacLean

[57] ABSTRACT

A fastening arrangement for a fuel injector including a retaining clip is disclosed which secures the injector to a fuel rail in a manner so that the injector cannot rotate relative to the rail. The clip has flexible arms defining an opening which is adapted to receive a portion of the fuel injector thereby locking the fastener and the fuel injector together. The clip also has a pair of opposed walls with elongated slot openings therein positioned to snap over an edge of a receiving nipple of the rail structure thereby securing the fastener and the rail together. The clip includes a pair of arms extending into overlying engagement with the fuel rail to prevent rotation of the clip and attached fuel injector relative to the rail.

7 Claims, 2 Drawing Sheets

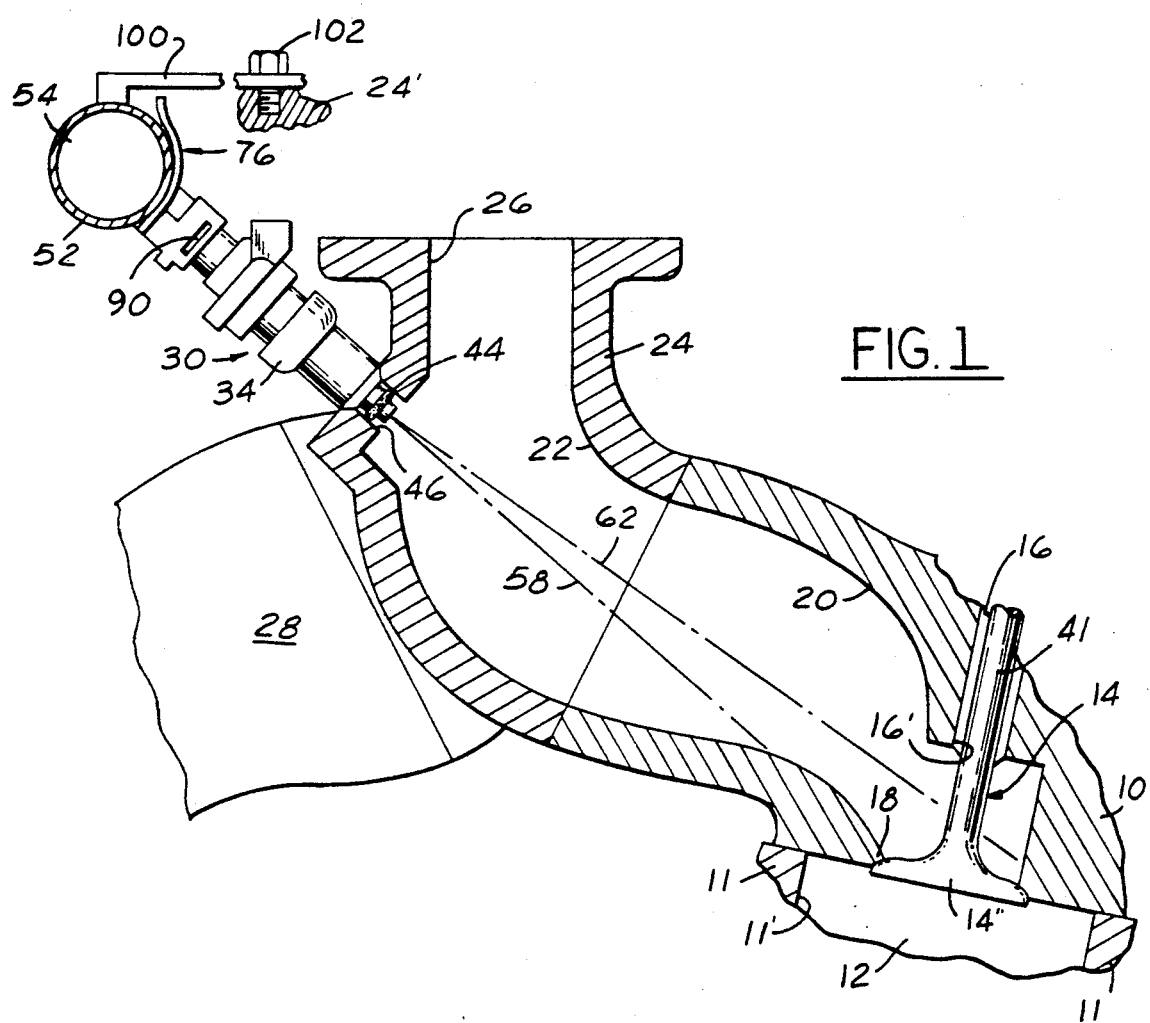
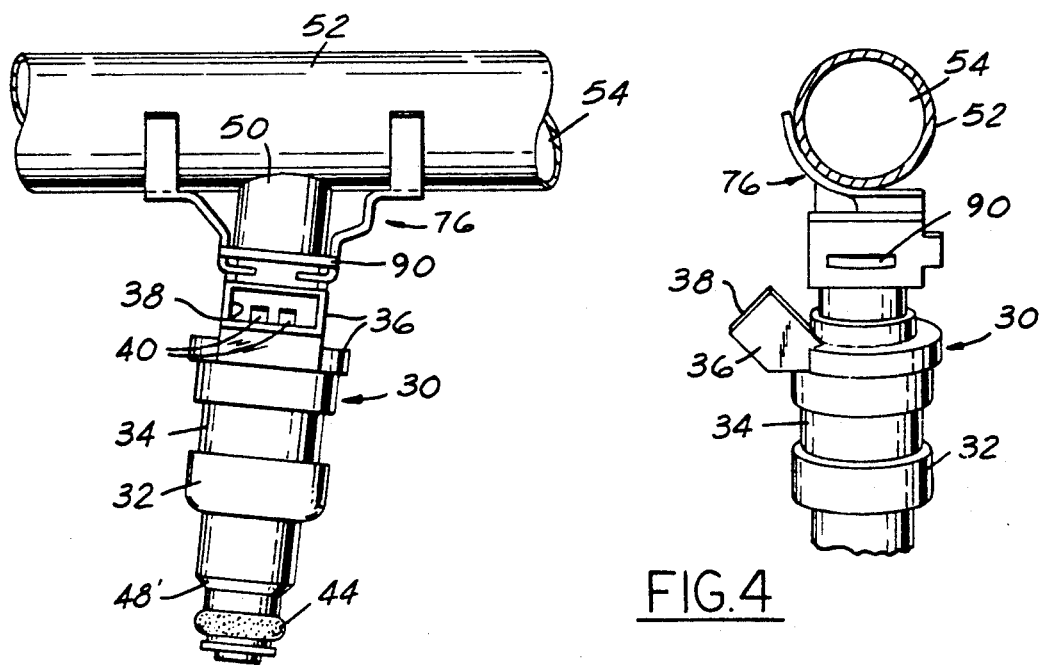

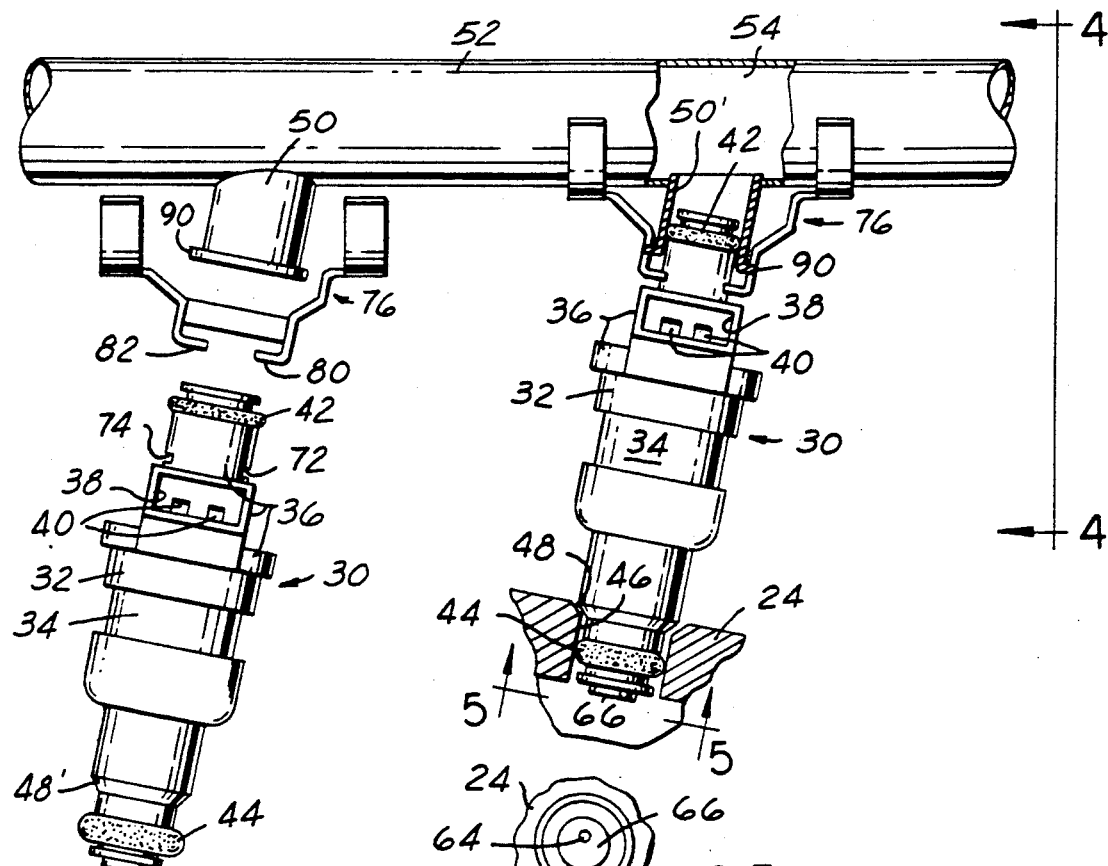
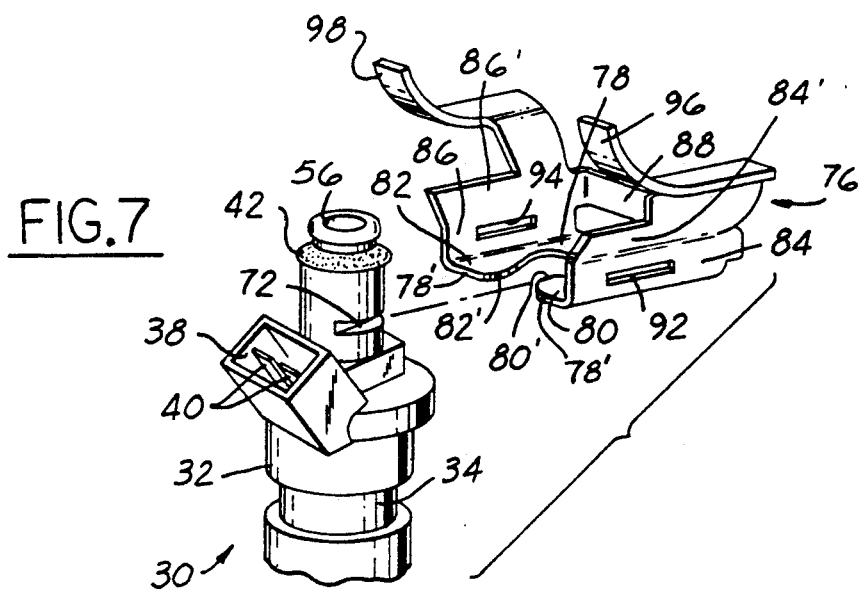

ANTI-ROTATION FUEL INJECTOR CLIP

BACKGROUND OF THE INVENTION

1. Field of Invention

A fuel injector support arrangement in which an inlet end portion of a fuel injector is insertably supported in a nipple of a fuel rail utilizing an improved retainer clip between the injector and the rail to inhibiting rotation of the fuel injector in the nipple.

2. Description of the Related Art

Mounting a fuel injector in a nipple of a fuel rail and retaining the injector by a clip to secure the fuel injector is disclosed in earlier patents. In U.S. Pat. No. 4,475,516 a clip is received in a groove about a fuel injector and then rotated to a lock position in grooves in a fuel rail body to secure the fuel injector.

The following patents disclose use of a clip to attach a fuel injector to a fuel rail but allow the injector to rotate relative to the rail: U.S. Pat. Nos. 4,294,215 to Hans; 4,307,693 Glockler; 4,474,159 to Katnik; 4,474,160 to Gartner; 4,539,961 to Atkins; 4,570,602 to Atkins; and 4,823,754 to Minamoto.

SUMMARY OF THE INVENTION

The subject arrangement secures a fuel injector to a fuel rail by a particular retainer clip so that the fuel injector cannot rotate relative to the rail. Prevention of injector rotation is important when a fuel injector with a nonsymmetrical or a multiple spray pattern is utilized.

The subject retainer clip includes a gripping portion which grabs the fuel injector as does earlier devices. However, a pair of grooves are formed in the fuel injector to form a resultant pair of flats which interact with the retainer clip to inhibit rotation between the fuel injector and the retainer clip. Further, the retainer clip has a pair of tabs extending into engagement with the associated rail assembly to inhibit rotation between the rail and the retainer clip. Resultantly, rotation of the clip and the associated fuel injector relative to the rail and the associated intake manifold is prevented.

Other features and advantages of the subject invention will be more apparent after a reading of the following detailed description of a preferred embodiment and reference to the drawings of the embodiment as described hereafter.

IN THE DRAWINGS

FIG. 1 is a partially sectioned elevational view of an engine intake manifold, cylinder head and fuel injector with the subject retaining clip; and FIG. 2 is a partially sectioned view of a fuel delivery rail and associated fuel injectors with the subject retaining clip, one fuel injector shown in a pre-assembled position and the other shown in an attached assembled position; and FIG. 3 is an elevational view of a fuel injector assembled to a fuel rail and retained by the subject clip; and FIG. 4 is an end elevational view of a fuel injector, fuel rail and clip taken along view line 4—4 in FIG. 2 looking in the direction of the arrows; and FIG. 5 is a partial planar view of the fuel injector's outlet end taken along view line 5—5 in FIG. 2 and looking in the direction of the arrows; and FIG. 6 is a planar view like FIG. 5 but of another embodiment of the outlet end; and FIG. 7 is a perspective and exploded view of the fuel injector and the subject fastening clip.

DETAILED DESCRIPTION OF AN EMBODIMENT

In FIG. 1, a portion of an internal combustion engine's cylinder head 10 is illustrated in association with portions of an engine block 11. Engine block 11 defines a cylindrical bore 11' which partially forms a combustion chamber 12. The cylinder head 10 supports an intake valve 14 of the usual poppet type design which includes an elongated stem portion 14' and an enlarged head portion 14". The stem portion 14' is supported in a tubular valve guide member 16 so that it is free to reciprocate between open and closed positions. The guide member 16 is supported in a bore 16' extending through cylinder head 10. The enlarged head portion 14" seats against an annularly shaped valve seat portion 18 of the cylinder head 10 when the valve 14 is in a closed position as shown.

The intake valve 14 regulates the flow of fluid into the combustion chamber 12. Upstream of the valve head 14" air flows through an intake passage 20 in the cylinder head 10. The intake passage 20 corresponds and is aligned with a similar passage 22 in an intake manifold 24. The intake manifold 24 is attached to the cylinder head 10 by fastener means (not shown in the drawings) in a known manner. The intake manifold 24 has an upstream inlet opening 26 adapted to receive air which is normally filtered by an air cleaner assembly or the like (not shown). The intake air can be pressurized by a pump as in a turbocharged or supercharged engine although it is unnecessary to pump the air as in a normally aspirated engine.

In FIG. 1, the cylinder head 10 and intake manifold 24 shown are specifically for a V-type engine which is currently a popular type of engine configuration. In FIG. 1, the section through the cylinder head 10 and manifold 24 directs air from an inlet 26 to a combustion chamber 12 in one side or bank of the engine. In the background of FIG. 1, another portion 28 of the cylinder head is partially shown for directing air to a combustion chamber in the other bank of the engine.

In addition to air, fuel must also be supplied to the combustion chamber. In FIGS. 1 and 2, a fuel injection system is illustrated to spray fuel into air passing through passages 20 and 22 and then into the combustion chamber 12 when the valve 14 is opened. As is known in the engine art, an electrically controlled fuel injector device 30 is provided for each passage 20, 22 to spray the required amount of fuel. The fuel injector 30 generally has an elongated body 32. Referring specifically to FIG. 2 (the left injector), the injector includes a somewhat tubular metal body portion 34 extending the length of the injector. Also, the injector 30 includes a molded elastomeric portion 36 extending about the upper portion. Molded portion 36 forms a receiver socket 38 which encircles a pair of metallic terminals 40. An electric connector (not shown) conforming to the socket 38 is adapted to be received in the socket 38 to control opening and closing of the injector 30. As is known in the fuel injector art, a flow regulating valve internal to the injector 30 controls fuel flow therethrough and into the associated engine in response to a variable electrical signal, usually generated by a computer or electronic control unit in accord with engine operating parameters.

As best shown in FIG. 2, both the upper and the lower end portions of the injector carry a O-ring type seal 42 and 44, respectively. Each O-ring resides in a groove or channel. In the drawing, the lower end portion of the fuel injector 30 is the outlet end which generates and directs a fuel spray into passages 22, 20 of the manifold 24 and cylinder head 10 respectively. In FIG. 2, righthand side, the injector's lower outlet end is shown extending into a bore 46 in the intake manifold 24. The outer entrance of bore 46 is formed with a tapered configuration 48 to match a similarly configured tapered configuration 48' on the lower end of the fuel injector 30. The tapers center the fuel injector 30 in the bore 46 and eases the insertion of the end therein. O-ring 44 fits tightly in bore 46 to seal the connection therebetween.

FIG. 2 (right side) shows a support of the upper inlet end of the fuel injector 30 within a tubular nipple 50 which has an internal passage 50'. Nipple 50 is attached to a tubular fuel delivery or supply rail 52 having interior passage 54. Passage 54 is adapted to be connected to a source of pressurized fuel including a fuel pump (not shown). Fuel is pumped from the rail's passage 54, through the nipple's passage 50' and into an inlet opening 56 of injector 30 as best seen in FIG. 7. The O-ring 42 about the inlet opening 56 tightly fits in the interior passage 50' of the nipple 50 to seal the connection. It should be noted that, so far, the support of the injector ends in bore 46 and nipple 50 will permit the fuel injector to rotate.

It is known to support a fuel injector in the manner explained above with its opposite end portions secured within openings of a fuel rail and an intake manifold, respectively. Typically, with this arrangement, a retaining device or clip is used to positively connect the fuel injector to the fuel rail. The connection is made in a pre-assembly step so that a pre-assembly of a fuel rail and fuel injectors are formed prior to attaching the pre-assembly to the engine. Thus, the pre-assembly is mounted on the engine as one unit. This arrangement saves assembly time.

A disadvantage of the typical pre-assembly of fuel injectors to a rail is that the injectors are free to rotate relative to the rail. Subsequent assembly of injectors to the manifold can result in undesirable orientation of the injector to the manifold. Rotation of the injector is unimportant when the outlet orifice of the fuel injector is coaxial with the injector axis as is usual. With this arrangement, the spray from the injector is symmetrical about the injector axis as shown in FIG. 1, by spray axis 58.

In some installations, a non-axial spray pattern from the injector 30 is desired and in this situation any rotation of the injector from a design orientation is undesirable. For example, in FIG. 1 it can be seen that the symmetrical flow path 58 intersects the lower surface 60 of passage 20 or is directed downward too much. Thus, a significant portion of the fuel spray fanning out from the axial path 58 would impinge on the surface of the cylinder head 10 upstream of the valve 14. Accordingly, in the cylinder head configuration shown in FIG. 1, it is desirable to provide a fuel spray with a central direction or axis 62 which is not coaxial with the fuel injector 30 but is non-symmetrical with respect to the injector axis. Referring to FIG. 5, a non-symmetrical or off-center orifice 64 in the outlet end 66 of the injector will produce the aforedescribed non-axial spray 62. Naturally, the outlet passage or orifice 64 extends in a non-axial direction with respect to the axis of the fuel injector 30.

In other installations or as an alternative to non-axial or offset orifice 64, it may be desired to provide multiple sprays as opposed to the one opening in the outlet end 66. FIG. 6 shows such an arrangement with two openings or orifices 68, 70.

The fuel injector support arrangement disclosed in this application mounts a fuel injector 30 as described above between a nipple 50 of fuel rail 52 and an opening in the manifold 24. Further, a specially designed fastener clip 76 is provided to connect the fuel injector 30 to the rail nipple 50 while preventing rotation of the injector relative to the rail. The clip 76 is perhaps best shown in FIG. 7 in association with the fuel injector 30. It can be seen in FIG. 7, injector 30 has a groove 72 formed in one side of its upper end which has a typical cylindrical surface. Groove 72 is formed by a straight cut and its longitudinal dimension extends in the injector's circumferential direction. A similar groove 74 (see FIG. 2) is formed in an opposite side of the injector's upper end. Both grooves 72, 74 define flat surfaces at the bottom of the groove.

The retainer device or clip 76 is used to fasten or secure injector 30 to the injector 30. Clip 76 has a lower or bottom wall portion 78 which is configured by spaced arm portions 80 and 82 separated by a gap formed therebetween. The gap is adapted to receive the upper end portion of the injector 30, thereby attaching the clip 76 to the injector 30. Specifically, edge portions 80' and 82' of arms 80, 82 engage the grooves 72, 74 of the injector. The edge portions immediately adjacent the forward edges 78' of arms 80, 82 are spaced slightly closer together than the remaining portion of the edges 80', 82'. This is so that the arms 80, 82 initially are flexed outward or away from one another as the upper end of the injector is moved into the gap between the arms. Then the arms 80, 82 flex back towards one another as the injector slides past the closer spaced edge portions of arms 80,82. This allows these edge portions to capture the injector as the remainder of the edges extend in the grooves. The above described engagement between the edges of the arms and the injector grooves prevents rotation of the retaining clip 76 with respect to the fuel injector 30.

Further, the retaining clip 76 has a pair of opposed side wall portions 84, 86 which extend upwardly from bottom wall 78 as best seen in FIG. 7. A strap-like configuration or member 88 extends across the rear of the clip between side wall portions 84, 86 but is not attached to the bottom wall 78. This rear strap 88 stiffens the side walls 84, 86 against moving apart but does permit outward flexure of the arm portions 80 and 82 as edge portions 80', 82' slide through the grooves 72, 74. Further, the side walls 84, 86 include obliquely angled portions 84', 86' which extend laterally outwardly from the remainder of the side walls. As will be seen, these angled portions 84', 86' serve to assist in attaching the injector and clip to the rail nipple.

The attachment of the sub-assembly of injector 30 and clip 76 to the fuel rail 52 begins with insertion of the upper end of the injector into nipple 50. A radially outwardly extending end flange or edge 90 is formed by the nipple 50 about its open end, best seen in FIG. 2. The side walls 84 and 86 of clip 76 have slots 92, 94 therein. These slots are adapted to receive edge 90 of nipple 50 as the upper end of the injector is fully inserted into the passage 50' of nipple 50. During this insertive movement, the engagement of edge 90 with the angled oblique surfaces 84', 86' flex side walls 84, 86 outward slightly. Movement of clip 76 over the edge 90 flexes walls 84, 86 until finally the edge 90 moves into slots 92, 94 as shown in FIGS. 2–4. The capture of edge 90 in slots 92, 94 secures the clip 76 to the nipple and therefore the fuel injector to the nipple 50.

As so far described, the injector and clip could rotate as a unit relative to the rail. To prevent this, the clip 76 has a pair of tabs or arms 96, 98 attached to wall portions 84', 86' and extending away from bottom wall 78 toward the rail 52. The tabs 96, 98 are curved to correspond generally to the curvature of the tubular fuel rail 52. When the injector 30 and clip 76 are insertably assembled to the rail nipple 50 as in FIGS. 1–4, tabs 96, 98 closely lie against the rail 52 in its circumferential direction. This contact of tabs 96, 98 and rail 52 prevents the clip 76 from rotating with respect to the rail and therefore the injector from rotating in the nipple 50. As previously explained, the interaction of the edges 80', 82' within grooves 72, 74 of injector 30 prevent rotation of the fuel injector itself relative to the clip. Accordingly, the aforedescribed specific orientation of a non-symmetrical type injector 30 relative to the intake manifold 24 is prevented.

One further description is necessary. As previously explained, the injector 30 is captured between the nipple 50 of the rail 52 and the intake manifold 24. To support the fuel rail 52, a bracket 100 is attached to the rail and is connected by a fastener 102 to a portion 24' of the intake manifold 24. Thus the rail 52 is attached to the engine with the injectors 30 captured between the rail and the manifold.

Although one embodiment of the anti-rotation clip for securing a fuel injector is illustrated in the drawings and described in detail, it should be clear that modifications in the design of the clip may be made without the resultant structure falling outside the scope of the invention as claimed hereafter.

We claim:

1. In association with a fuel delivery system for an internal combustion engine having a generally tubular fuel rail device to supply pressurized fuel to an inlet end portion of a fuel injector and having an intake manifold with an opening therethrough adapted to receive and support an outlet end portion of the fuel injector, an improved arrangement for supporting the fuel injector between the fuel rail device and the intake manifold, comprising: the tubular fuel rail having a tubular support nipple defining an open end adapted to receive the inlet end portion of the fuel injector, the support nipple being fluidly connected to the interior of the fuel rail for supplying fuel to the injector; a radially outwardly projecting edge extending about the open end of the support nipple; a retainer clip for attaching the fuel injector to the nipple portion in a manner so that the fuel injector is inhibited from rotating; grooves formed in the inlet end portion of the fuel injector forming opposite flat surfaces thereon; the retainer clip having a generally planar base wall characterized by a pair of spaced arms with edge portions defining a socket therebetween sufficient to tightly receive and the inlet end portion of the fuel injector with an edge of each arm extending through one of the grooves and with the edges engaging the injector's flat surfaces so that the injector is inhibited from rotation with respect to the clip; a pair of opposite side walls, one extending from each arm of the base and extending adjacent the open end of the nipple; a slot in each side wall to receive the radially outwardly directed edge of the nipple thereby securing the clip to the nipple and thus the rail; elongated tab means extending from each side wall into overlying contact with the rail to inhibit rotation of the clip relative to the rail and therefor rotation of the fuel injector relative to the intake manifold.

2. The improved support arrangement as set forth in claim 1 in which the elongated tab means first extend away from the base of the clip and then are curved so as to overlie the outer surface of the fuel rail and extend in a circumferential direction.

3. The improved support arrangement as set forth in claim 1 in which the side walls have an intermediate surface between the slot bearing portion and the tab portion which intermediate surface is angled obliquely so that the side walls are progressively flexed away from one another as the retainer clip is moved over the edge on the nipple to place the edge in the slots while simultaneously the inlet end portion of the fuel injector is inserted into the nipple.

4. In an internal combustion engine having an intake manifold with an opening therethrough, a fuel rail with an open ended nipple, and a fuel injector with an outlet end portion extending into the manifold opening and an inlet end portion extending into the nipple's open end, an improved retainer clip for attaching the fuel injector to the nipple in a manner inhibiting rotation of the fuel injector relative to the fuel rail, a radially outwardly projecting edge portion about the open end of the nipple, the retainer clip having means connecting the retainer clip to the fuel injector and preventing relative rotation therebetween, the retainer clip having opposed side walls each with a slot therethrough for receiving the outwardly projecting edge of the nipple when the retainer clip and the fuel rail are assembled together, elongated tab means extending from each side wall into overlying contact with the rail to inhibit rotation of the clip relative to the rail and therefor rotation of the fuel injector relative to the intake manifold.

5. The improved retainer clip of claim 4 having a base with spaced arm portions each having edges defining a gap therebetween to receive and grip the fuel injector in a manner inhibiting rotation; a side wall extending away from each arm of the base and adjacent the nipple of the fuel rail, each tab being curved corresponding to the curvature of the rail permitting the tabs to closely overlie the rail in a circumferential direction thereby preventing rotation of the fuel injector.

6. The improved retainer clip of claim 5 in which the elongated tabs first extend away from the base of the clip and then are curved so as to overlie the outer surface of the fuel rail and extend in a circumferential direction.

7. The improved retainer clip of claim 5 in which the side walls have an intermediate surface between the slot bearing portion and the tab portion which intermediate surface is angled obliquely so that the side walls are progressively flexed away from one another as the retainer clip is moved over the edge on the nipple to place the edge in the slots.

* * * * *